United States Patent
Lindemann (10) Patent No.: US 7,810,219 B2
(45) Date of Patent: Oct. 12, 2010

(54) CLAMP FOR TIMING BELT

(75) Inventor: Robert E. Lindemann, St. James, NY (US)

(73) Assignee: Designatronics, Inc., New Hyde Park, NY (US)

( * ) Notice: Subject to any disclaimer, the term of this patent is extended or adjusted under 35 U.S.C. 154(b) by 1069 days.

(21) Appl. No.: 11/517,338

(22) Filed: Sep. 8, 2006

(65) Prior Publication Data

US 2008/0060171 A1    Mar. 13, 2008

(51) Int. Cl.
*F16G 3/00*  (2006.01)
(52) U.S. Cl. .......................................... 24/31 R; 24/37
(58) Field of Classification Search ................ 24/31 R, 24/37, 34, 31 B; 403/208, 286, 293, 298, 403/310–312; 474/253, 256, 257, 258, 255, 474/35

See application file for complete search history.

(56) References Cited

U.S. PATENT DOCUMENTS

| | | | | |
|---|---|---|---|---|
| 9,080 A * | 6/1852 | Smith | | 24/37 |
| 42,170 A * | 4/1864 | Cuppers | | 24/37 |
| 74,449 A * | 2/1868 | Thomas | | 24/37 |
| 167,832 A * | 9/1875 | Fox | | 24/37 |
| 291,202 A * | 1/1884 | Koch | | 24/37 |
| 1,686,300 A * | 10/1928 | Vollrath | | 24/37 |
| 2,330,434 A * | 9/1943 | Lazzell | | 24/37 |
| 2,430,328 A * | 11/1947 | Daniels | | 474/248 |
| 3,810,278 A * | 5/1974 | Kenney | | 24/31 W |
| 3,839,766 A * | 10/1974 | Kenney | | 24/31 W |
| 3,989,226 A * | 11/1976 | Burgess | | 256/65.04 |
| 4,023,671 A * | 5/1977 | Kramer | | 198/728 |
| 4,258,461 A * | 3/1981 | Pray | | 29/243.5 |
| 5,419,017 A * | 5/1995 | Buchanan et al. | | 24/33 R |
| 6,216,849 B1 * | 4/2001 | Sytema | | 198/731 |
| 7,007,349 B2 * | 3/2006 | Musil et al. | | 24/37 |
| 7,077,263 B1 * | 7/2006 | Richardson et al. | | 198/844.2 |
| 2008/0200295 A1* | 8/2008 | Schaefer | | 474/255 |

* cited by examiner

*Primary Examiner*—Victor Batson
*Assistant Examiner*—Rowland D Do
(74) *Attorney, Agent, or Firm*—Stein McEwen, LLP (57) ABSTRACT

A belt clamp for securing the free ends of a length of timing belt stock together to form an endless timing belt. The clamp consists of an inverted, U-shaped cover, a U-shaped base, and a fastener that passing through aligned, centrally located apertures in the cover and the base to draw the cover and base together, in an overlapping relationship. A plurality of recesses is formed on the upper surface of the base. A bed is centrally located on the base and interrupts the recesses. The free ends of a length of timing belt stock are placed on the bed, and are retained in fixed position by the pressure applied by the fastener as the cover and base are drawn together. Protrusions, such as ribs, teeth, or buttons, formed on one, or both sides, of the timing belt stock are pressed into the complementary recesses in the base.

11 Claims, 7 Drawing Sheets

CLAMP FOR TIMING BELT

FIELD OF THE INVENTION

The present invention relates generally to clamps for securing together the free ends of timing belt stock to form an endless timing belt.

BACKGROUND OF THE INVENTION

Timing belts are used in various metering, positioning, conveying, and oscillating drives for instruments, mechanisms, tools, etc. Timing belts are formed of durable plastics, such as neoprene and polyurethane, which may be reinforced by tensile metal cords. Timing belts vary in width, the number of protrusions, the type of the plastic suitable for the operating conditions imposed upon the timing belt, and other parameters.

Timing belts are available in commonly used, or standard, lengths. Where belt lengths are required that are longer than the standard lengths stocked by suppliers and distributors of precision mechanical components, a new, longer belt is formed from a length of timing belt stock. A clamp is used to join the opposing ends of the length of belt stock into an endless belt. The resulting endless belt is greater in length than the standard belts, and is capable of addressing the specific requirements of the user.

Diverse clamps have been devised for securing together the opposing, free ends of a length of timing belt, drive belt, etc., to form a continuous loop. For example, U.S. Pat. No. 5,338,265, discloses an emergency drive belt apparatus including a first connector assembly 17 attached to the first end 14 of the belt 12, and a second connector assembly 23 attached to the second end of the belt 12. Triangular shaped teeth 19, 25, of complementary shape, on the opposing ends of the belt, are forced together by a locking member 18 that assumes the form of a flexible sleeve.

Another clamp, available for purchase from the Stock Drive Division of Designatronics, Inc., of New Hyde Park, N.Y., the assignee of the present invention, comprises a flat, rectangular top plate, a rectangular grooved clamp plate, or base, with aligned apertures extending through the top plate and clamp plate. The upper surface of the clamp plate has parallel grooves formed therein. The grooves are shaped and sized to receive the complementary teeth formed on one side of a length of belt stock. An aperture is formed inwardly of each corner of the top plate and the clamp plate. Fasteners, such as bolts with threaded shanks, are inserted through the apertures and are received in nuts on the underside of the clamp plate. The nuts and bolts are tightened to draw the top plate and clamp plate together, sandwiching the free ends of the belt stock therebetween. The ends of the belt stock are retained inwardly of the bolts, thus limiting the range of belt widths to which the clamp may be applied.

The several fasteners used to join the foregoing clamp together render the clamp difficult to install and/or replace, particularly in tight spaces. Also, the clamp is relatively expensive, since it requires several machining operations to produce same. Furthermore, known clamps are relatively bulky and heavy, and impose stresses on the timing belt which limit the speed of the belt.

Consequently, the need for a simple, low cost, inexpensive, easily installed belt clamp, relying upon a single fastener to join the components of the clamp securely together, remains undiminished. Also, the requirement for such a belt clamp, that can function effectively with single sided, or dual sided, lengths of timing belt stock, remains unfulfilled. Furthermore, the requirement for a lightweight, sturdy belt clamp of reduced width, that will accommodate belts of different widths and different configurations of protrusions, such as ribs, teeth, or buttons, remains unsatisfied. Lastly, the need for a belt clamp, that functions as a platform for mounting a position indicating device, such as a pointer, magnet, optical sensor, or other position locating device, remains unmet.

SUMMARY OF THE INVENTION

With the deficiencies of known belt clamps clearly in mind, applicant has devised a belt clamp that addresses, and overcomes, each deficiency noted above. Applicant's clamp comprises a base, a cover, and a single fastener, such as a bolt with an enlarged head and a threaded shank, that cooperates with a nut, for drawing the base and cover together while securing the free ends of a length of timing belt stock therebetween. The upper surface of the base has a plurality of spaced recesses on its upper surface that receive the protrusions on the facing side of the timing belt.

The cover of the belt clamp possesses an inverted U-shape, with a rectangular, planar central section, and a first and a second leg depending from opposite sides of the central section. The cover fits over the U-shaped base, for the legs are of sufficient length to enclose the opposite sides of the base, when the clamp is drawn together by tightening the fastener and the cooperating nut.

A bed is centrally located on the base to interrupt the plurality of recesses, which may assume the form of grooves or cavities. A first aperture is located in the bed and extends vertically therethrough. The opposing ends of the length of timing belt stock are placed on the bed, prior to placing the cover of the belt clamp over the base. A second aperture is formed in the center of the planar section of the cover. The apertures are aligned, and the single fastener is passed therethrough. A nut is applied to the free end of the single fastener, and the fastener and nut draw the cover over the side walls of the base. The free ends of the timing belt stock are locked in fixed position upon the bed.

Projections, on the upper surface of the cover of the belt clamp, extend upwardly and cooperate with an L-shaped bracket, or other mounting device, for securing a position indicating sensor to the belt clamp. The sensor provides a signal indicating the exact position of the belt clamp.

The central location of the single fastener exerts increased pressure in the central area of the clamp, to securely grasp, and retain, the opposite ends of the length of timing belt stock seated therebetween. The clamp, which is executed in a lightweight durable plastic, functions effectively over a range of belt widths, and receives, and retains, timing belts with protrusions of different dimensions and shapes. The light weight insures that the belt clamp will not impose undue stress and strain on the timing belt, and the timing belt may be operated at high speeds.

Side walls, on the lateral edges of the base, restrain the belt from slipping laterally within the assembled belt clamp when lengths of timing belt stock with ribs and grooves are used. The clamp is narrower in width than known clamps, and the reduction in width makes the belt clamp easier to install, in tight places, without sacrificing operational efficiency. Alternatively, the side walls on the lateral edges of the base may be omitted, when the length of timing belt stock has centrally located buttons formed thereon.

Other advantages realized by applicant's unique belt clamp will become readily apparent to the skilled artisan, when the appended drawings are construed in harmony with the ensuing specification.

DESCRIPTION OF THE PREFERRED EMBODIMENT

Figure 1:
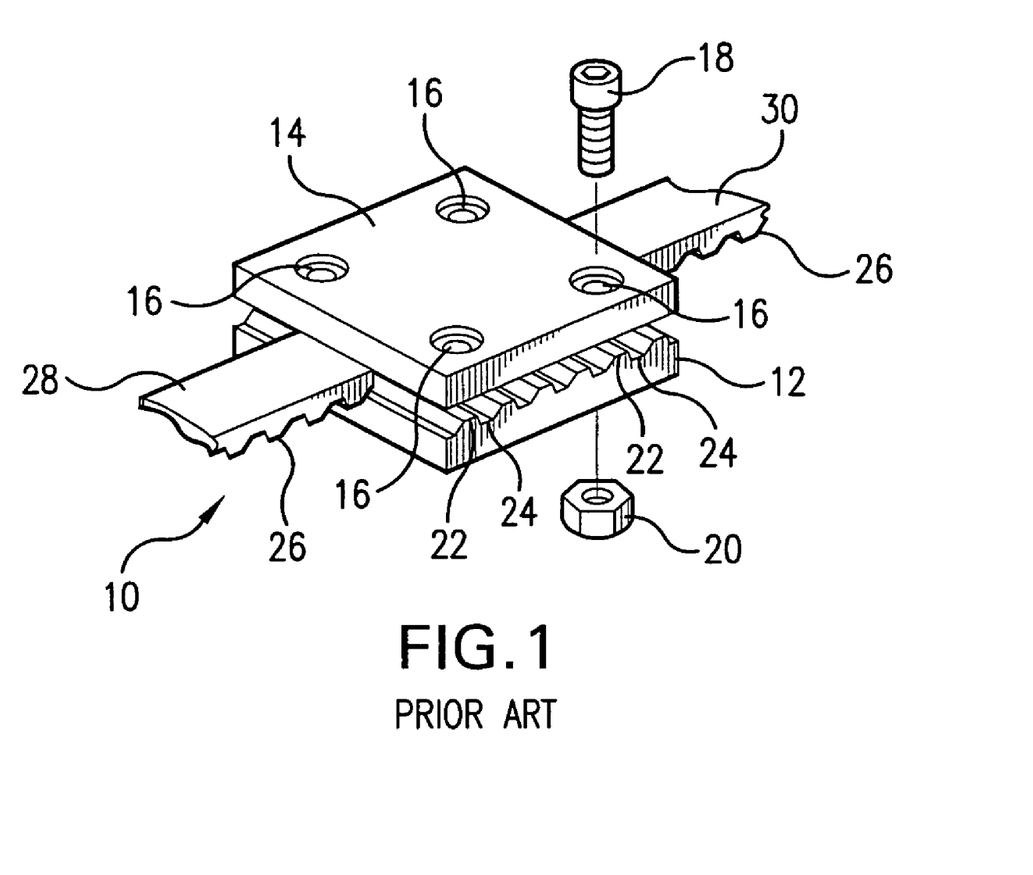
FIG. 1 is perspective view of a conventional belt clamp, which is labeled PRIOR ART.

FIG. 1, which bears the legend PRIOR ART, illustrates a conventional belt clamp 10. Clamp 10 comprises base 12, and top plate 14 with a recessed aperture 16 in each corner. Fasteners, such as bolt 18, are passed through apertures 16 and aligned apertures (not shown) in base 12; a nut 20 is advanced along the shank of each bolt 18. The bolts and nuts are tightened to draw top plate 14 and base plate 12 together, until the enlarged head of each bolt 18 is seated within recessed aperture 16. Belt clamp 10 requires four bolts and four nuts for successful operation, although only a single bolt 18 and a corresponding nut 20 are shown for the sake of clarity.

Parallel ribs 22 extend laterally across base 12, and the ribs are separated from one another by valleys, or depressions, 24. Ribs 22, and valleys 24 on base 12 receive complementary protrusions, such as ribs, or teeth, 26 on the underside of lengths 28, 30 of timing belt stock and retain the belt stock in fixed position when the bolts 18 and nuts 20 are drawn together, thereby forming an endless timing belt.

FIGS. 2, 2A, 2B, 3-5, and 6A-6B depict applicant's simple, yet effective, belt clamp, indicated generally by reference numeral 50, for securing the opposing ends 52A, 52B of a length of timing belt stock, thereby forming a continuous loop. Belt clamp 50 includes an inverted U-shaped cover 54 and a complementary U-shaped base 56. The cover comprises a rectangular central section 58 with a first depending leg 60 at one side thereof, and a second, identical depending leg 62 at the opposite side thereof. Cover 54 slips over base 56, which is slightly smaller in size, to retain the opposing ends 52A, 52B of the length of timing belt stock therebetween.

Figure 2:
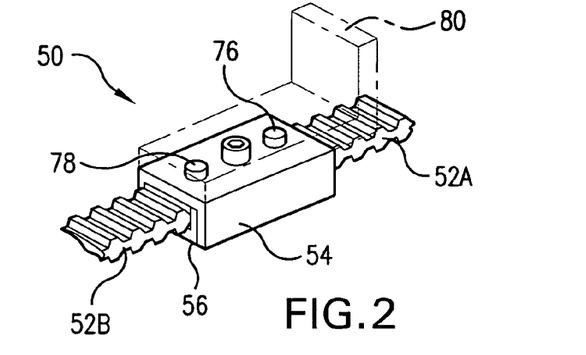
FIG. 2 is a perspective view of applicant's unique belt clamp.
Figure 2A:
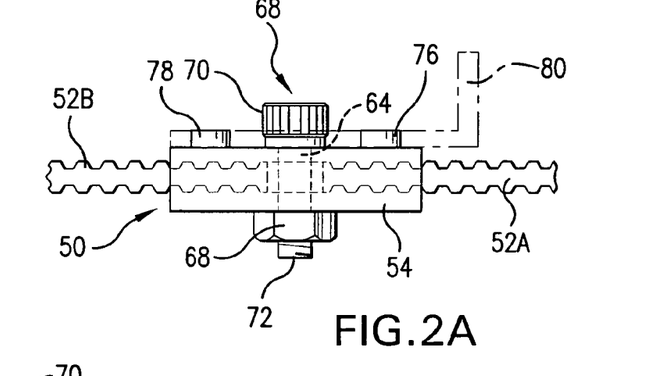
FIG. 2A is a side view of the belt clamp of FIG. 2.
Figure 2B:
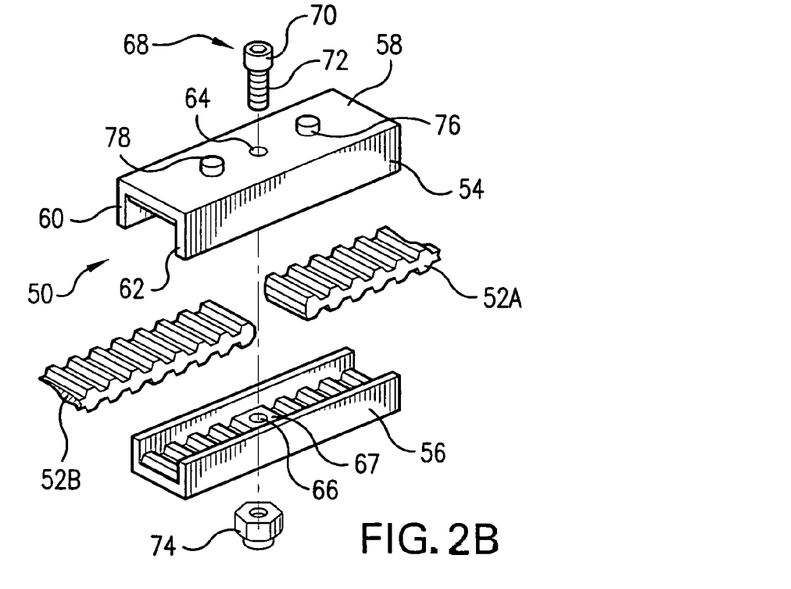
FIG. 2B is an exploded perspective view of the belt clamp of FIG. 2.

An aperture 64 is located at the midpoint of central section 58 of cover 54, and an aperture 66 is formed, centrally, through bed 67 of base 56. A fastener, such as bolt 68, with an enlarged head 70 and a threaded shank 72, is passed through the aligned apertures 64, 66 and is captured by nut 74 at the underside of base 56. An Allen-wrench, screw driver, or similar tool, may be inserted into a slot or notch in head 70 of bolt 68 and is rotated to tighten cover 54 upon base 56. The underside of cover 54 presses the ends of 52A, 52B of the timing belt stock firmly against bed 67.

Projections 76, 78 are formed on the upper surface of central section 58 of cover 54. L-shaped bracket 80, shown in phantom outline in FIGS. 2 and 2A, but omitted from FIGS. 2B, 3-5, 6A and 6B) may be located by the projections 76, 78. Position locating devices, such as pointers, magnets, or sensors (not shown), are retained by bracket 80 in operative relationship to the timing belt.

Figure 3:
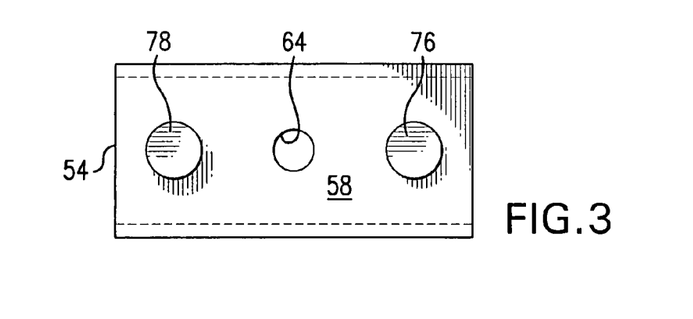
FIG. 3 is a top plan view of the belt clamp of FIG. 2, prior to insertion of the fastener.

FIG. 3 shows that protrusions 76 and 78 are spaced on opposite sides of aperture 64 in cover 54.

Figure 4:
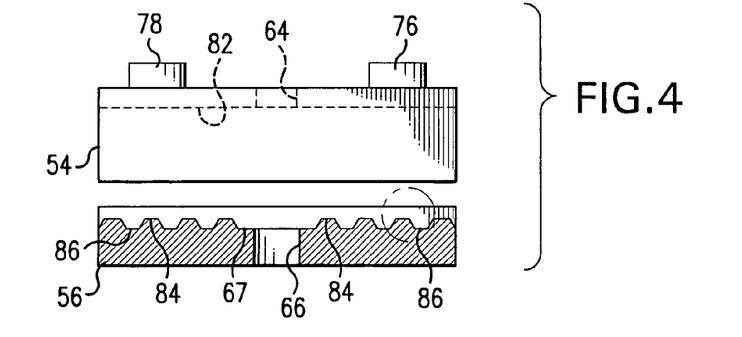
FIG. 4 is an exploded side view of the belt clamp of FIG. 3, with the cover poised above the base plate.

FIG. 4 shows that the interior surface 82 or underside of cover 54, is smooth and continuous as it extends across the length of the cover, except for centrally located aperture 64 that extends vertically through the central section 58. Surface 82 rests upon the upper surface of the lengths 52A, 52B of timing belt stock retained in belt clamp 50. Ribs 84 and grooves 86 on base 56 engage the complementary ribs and grooves on the bottom surface of the lengths of timing belt stock captured within clamp 50, so that the timing belt is securely seated.

Figure 5:
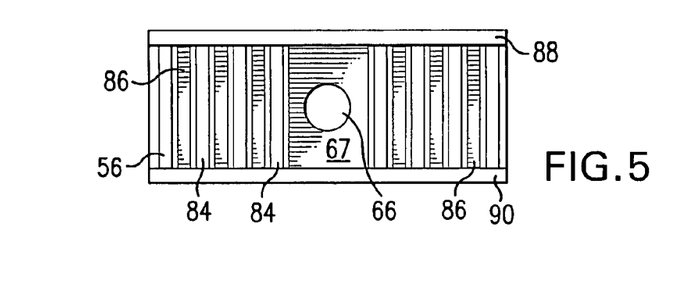
FIG. 5 is a top plan view of the base employed in the belt clamp of FIG. 4.

Base 56, as shown in FIGS. 4 and 5, contains alternating protrusions, such as ribs 84, and recesses, such as grooves 86, that extend across the lateral extent, or width of the base. Ribs 84 and grooves 86 also extend along the length of the base, although bed 67 interrupts the alternating pattern of ribs 84 and grooves 86 in the central area of base 56. Aperture 66 extends vertically through bed 67, and is aligned with aperture 64 in cover 54. Side walls 88 and 90 are situated on the opposite, longitudinally extending sides of base 56. The side walls extend vertically above ribs 84 and bed 67 on the base to retain the longitudinal edges of the timing belt within the confines of U-shaped base 56, thereby precluding lateral slipping of the timing belt.

Figures 6A, 6B:
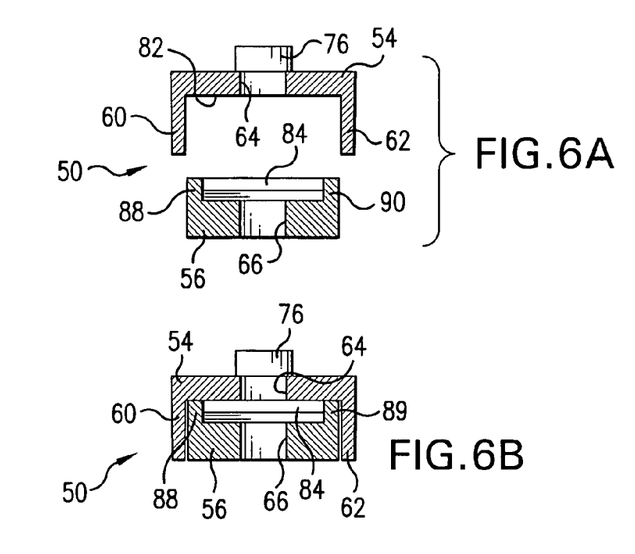
FIG. 6A is an exploded end view of applicant's belt clamp, with the cover poised above the base of the belt clamp.
FIG. 6B is an end view of the belt clamp of FIG. 6A, with the cover seated upon the base of the belt clamp.

FIG. 6A shows an exploded end view of applicant's clamp 50. Inverted, U-shaped cover 54, which fits over U-shaped base 56, is shown poised above the base. Aperture 64, in cover 54, is aligned with aperture 66 in bed 67 in base 56. The cover and base are drawn together in an overlapping manner, shown in FIG. 6B, by fastener 68 and nut 74 (shown in FIGS. 2A and 2B). Clamp 50 is capable of joining together lengths of timing belt stock with protrusions, such as ribs, and grooves on one surface, as well as lengths of double sided timing belt stock with ribs and grooves on both its upper and lower surfaces, as shown in FIGS. 2, 2A and 2B.

Figure 7:
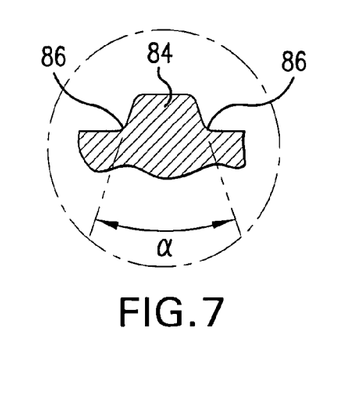
FIG. 7 is a side view, on an enlarged scale, of one of the protrusions, such as ribs, on the base of the belt clamp, and the grooves, on opposite sides of the protrusion, such view being indicated by circular insert VII in FIG. 4.

FIG. 7 shows, on an enlarged scale, a protrusion, or rib 84, of the plurality of ribs on base 56. The rib extends upwardly above recesses, or valleys, 86 and the slope of opposite faces of rib 84 is indicated by arc a. Ribs 84 and recesses, or grooves, 86 form an alternating pattern along base 56, interrupted only by bed 67.

Figure 8A:
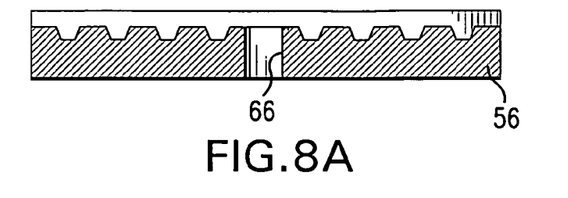
FIGS. 8A, 8B and 8C are side views of three different bases that may be used in applicant's belt clamp, each base utilizing ribs and recesses, such as grooves, of a different configuration.
Figure 8B:
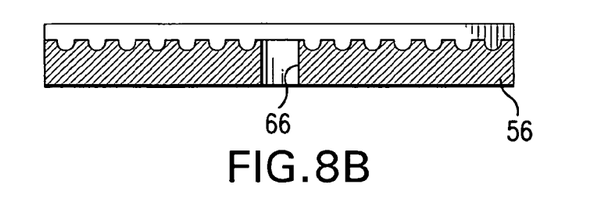
Figure 8C:
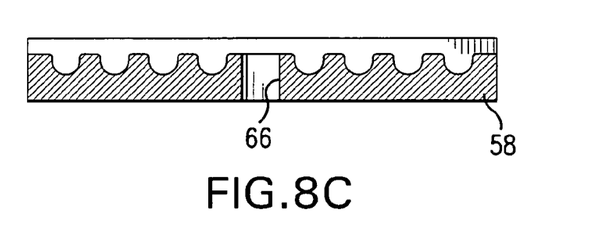

FIGS. 8A, 8B, and 8C are side views of three different bases 56, with protrusions, or ribs, 84, and recesses, or grooves 86, of different sizes and shapes that may be used in the applicant's clamp 50. Different bases function satisfactorily with different patterns of ribs and recesses of complementary size on the timing belt stock.

Figure 9A:
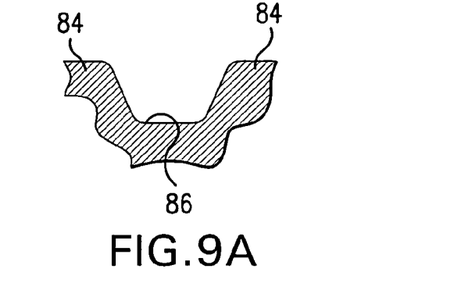
FIGS. 9A, 9B and 9C are fragmentary views of an enlarged scale, showing the pitch of the protrusions, or ribs, and the depth of the associated recesses, between the ribs of the bases of FIGS. 8A, 8B and 8C.
Figure 9B:
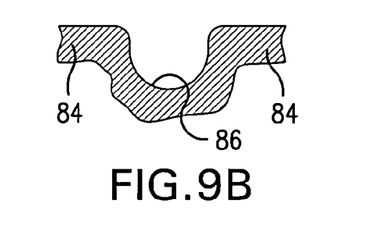
Figure 9C:
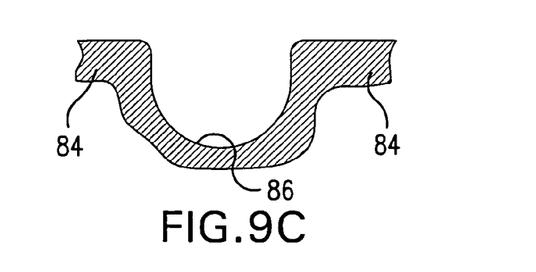

FIG. 9A shows, on a greatly enlarged scale, the details of an individual protrusion, or rib, 84 and adjacent recesses, or grooves, on base 56 in FIG. 8A. FIG. 9B shows the details of a somewhat differently shaped protrusion, or rib 84, and adjacent recesses, or grooves, 86, on base 56 in FIG. 8B. FIG. 9C shows the details of another differently shaped protrusion or rib, and adjacent recesses, or grooves, on base 56 in FIG. 8C.

Figure 10:
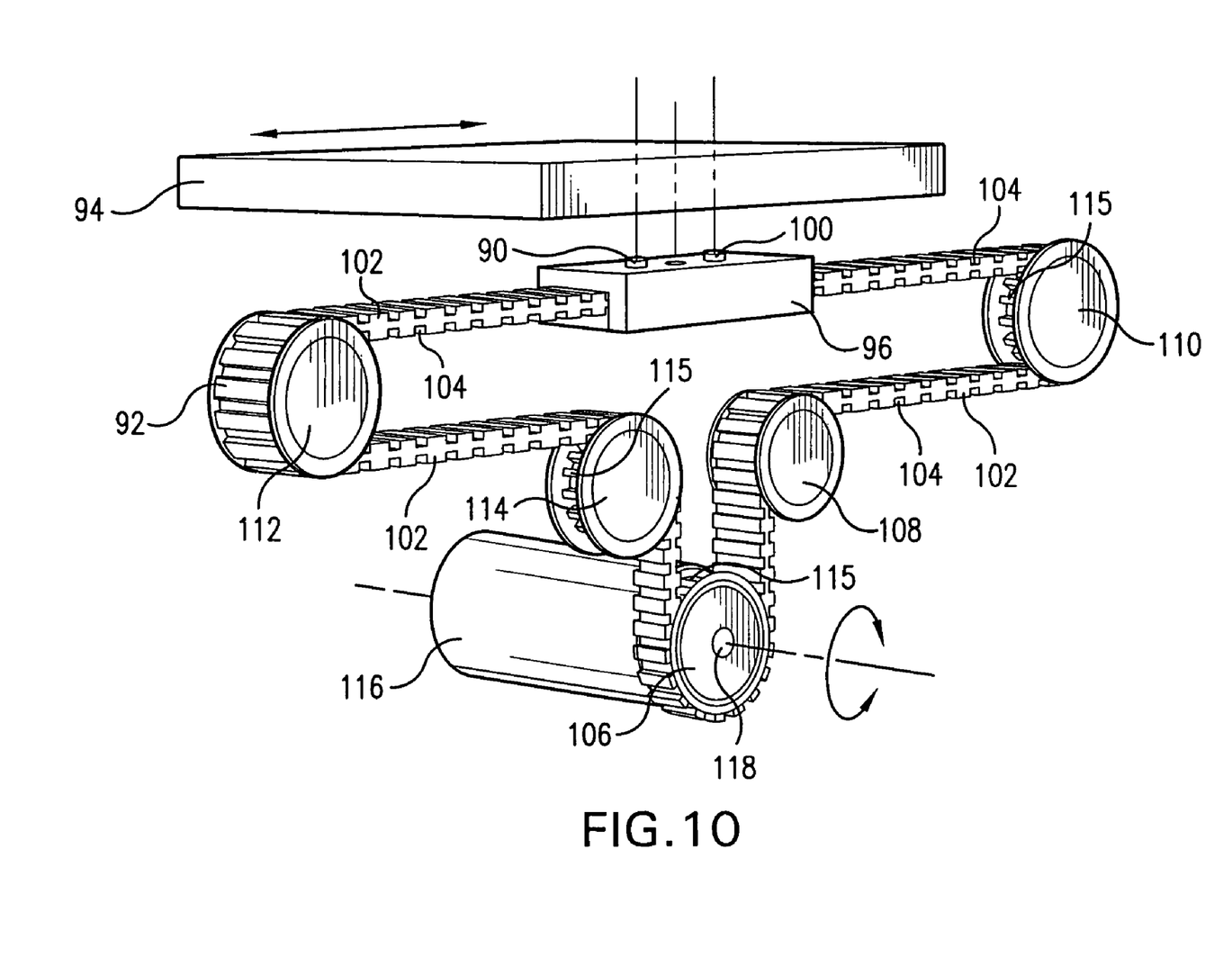
FIG. 10 is a perspective view showing a timing belt system for translating a sensor secured to a belt clamp, in the longitudinal direction.

FIG. 10 shows a system, utilizing timing belt 92 for oscillating sensor 94, secured to belt clamp 96, to and fro, in the longitudinal direction, as indicated by the two headed directional arrow. The sensor may be placed into engagement with pins or protrusions 98, 100 on the upper surface of belt clamp 96, or may be secured thereto, indirectly, via a bracket or other mounting fixture.

Protrusions, such as ribs 102, and grooves 104 are defined on both surfaces of the timing belt 92, made endless by the clamp 50 so that the belt may drive, or be driven, in either direction. Endless timing belt 92 is trained about drive pulley 106, and pulleys 108, 100, 112 and 114. Ribs 115 are formed on the surface of each pulley to engage the protrusions, or ribs, on the contacting surface of belt 92, and to drive the belt in a clockwise, or counterclockwise, manner. Power from motor 116 is delivered via shaft 118 on pulley 106 to drive endless belt 92. The endless belt, in turn, drives pulleys 108, 110, 112 and 114, in either direction, and shifts belt clamp 96, and sensor 94, accordingly. Sensor 94 indicates the precise position of timing belt 92.

Figure 11A:
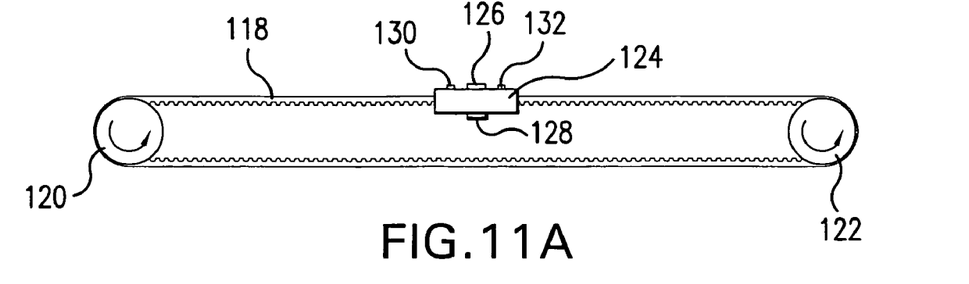
FIG. 11A is a schematic view of applicant's belt clamp secured to opposite ends of a length of timing belt stock to form an endless belt.

FIG. 11A depicts endless timing belt 118 trained about spaced pulleys 120, 122. Belt clamp 124 secures the free ends of a length of timing belt stock together to form an endless timing belt of greater length than standard timing belts available from distributors and suppliers of precision, technical products. A single, centrally located fastener 126 and nut 128 draw the cover and base of belt clamp 124 together; projections or pins 130, 132 are visible on the upper surface of belt clamp 124. Endless timing belt 118 has protrusions, such as ribs, and grooves on its inner surface, so that the belt can be driven in one direction, as indicated by the directional arrows on pulleys 120 and 122.

Figure 11B:
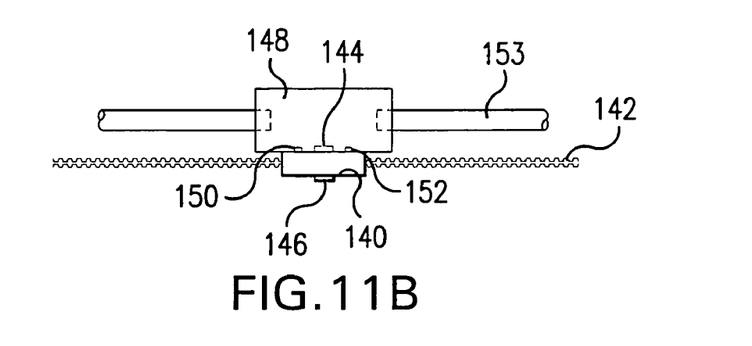
FIG. 11B is a schematic view of a fragment of timing belt stock, utilizing applicant's belt clamp, with a sensor secured thereto.

FIG. 11B shows a belt clamp 140 for securing the opposite ends of a length of timing belt stock 142 together. Timing belt stock 142 employs protrusions, such as ribs and grooves on its inner and outer surfaces, so that the belt may be driven in both the clockwise, and counterclockwise, directions. Fastener 144 passes through the center of belt clamp 140 and sensor 148 and, in cooperation with nut 146, draws the clamp 140 and sensor 148 together. Sensor 148 is positioned by pins 150, 152 on belt clamp 140, so that the sensor is properly oriented with the belt clamp. Sensor 148 moves along guide rail 153, as the timing belt moves in the clockwise and counterclockwise direction. The sensor may be a photoelectric sensor, scanner, magnetic sensor, etc. for indicating the exact position of the belt clamp.

Figure 12:
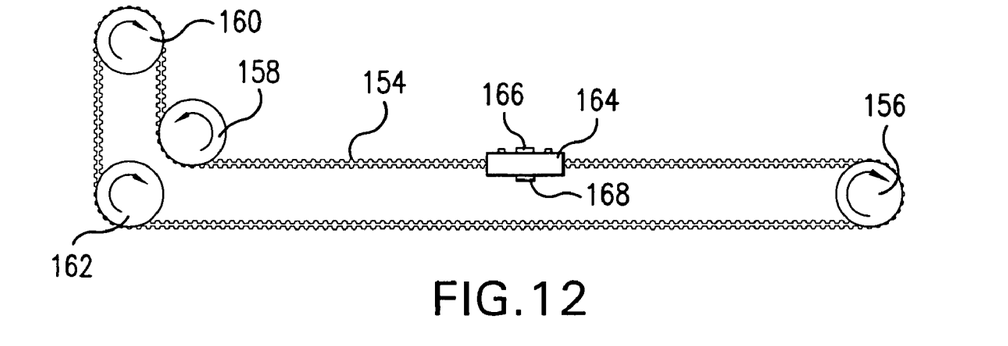
FIG. 12 is a schematic view of a length of timing belt stock with protrusions, or teeth, on both surfaces, trained about several pulleys, for movement in the clockwise and/or counterclockwise direction of the pulleys themselves.

FIG. 12 shows another timing belt system including dual-sided belt 154 that is trained about pulleys 156, 158, 160 and 162. Belt clamp 164 employs bolt 166 and nut 168, and receives, and retains therein, the opposing free ends of a length of timing belt stock upon a centrally located bed (not shown) in the middle of the base. Pulley 156 is driven in the clockwise direction to move belt 154 and belt clamp 164 to the right, in FIG. 12. Power is delivered to pulley 158 to move belt 154 and belt clamp 164 to the left in FIG. 12. A sensor (not shown) may be secured atop clamp 164 to indicate the direction of travel of the belt, as well as its location relative to pulleys 156 and 158.

Figure 13A:
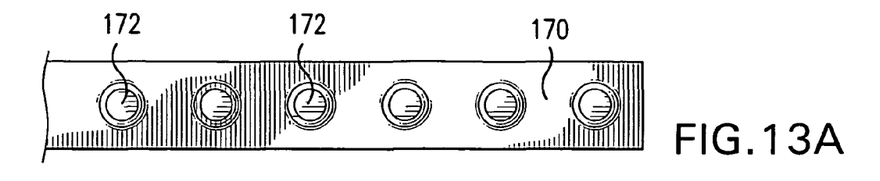
FIG. 13A is a top plan view of a fragment of a timing belt having spaced buttons on one side thereof.
Figure 13B:
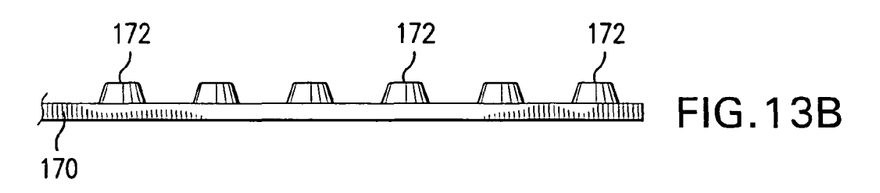
FIG. 13B is a side view of the timing belt of FIG. 13A.

FIGS. 13A and 13B show a fragment 170 of timing belt stock utilizing a plurality of frusto-conical protrusions 172 on the surface. Protrusions 172, which are also known as buttons, extend along the longitudinal center-line of the timing belt stock, and are employed in lieu of the ribs, or teeth, on one, or both surfaces, of known timing belt stock.

Figure 14A:
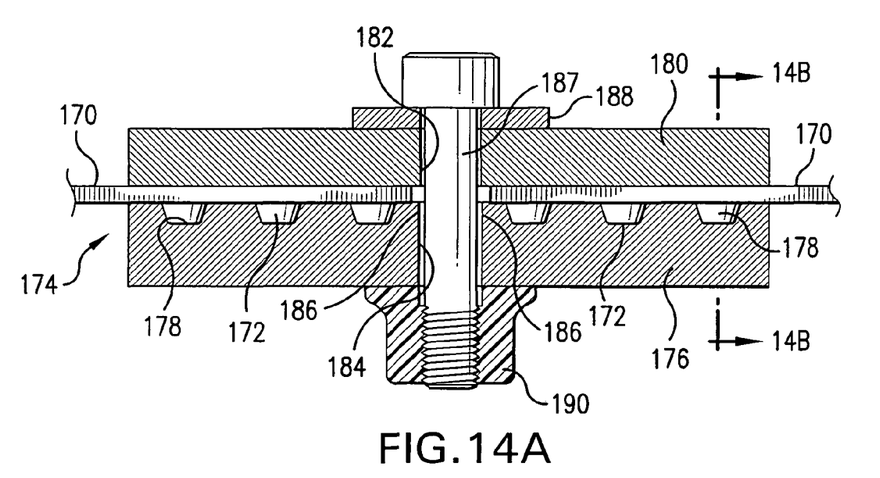
FIG. 14A is a cross-sectional view, on a longitudinal plane, of applicant's belt clamp retaining therein a length of timing belt stock having buttons.
Figure 14B:
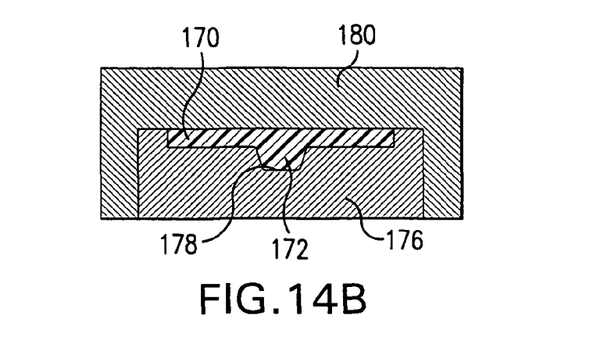
FIG. 14B is a vertical cross-sectional view of applicant's belt clamp retaining therein a length of timing belt stock having buttons, such view being taken along line 14B in FIG. 14A, and in the direction indicated.

FIGS. 14A-14B show an alternative embodiment 174 of applicant's belt clamp. Belt clamp 174 comprises U-shaped base 176 with spaced recesses 178 that receive, and retain, protrusions on timing belt stock 170. Cavities 178 are complementary in shape to protrusions or buttons 172, but are slightly larger in size, so that the protrusions are snugly received therein. Inverted U-shaped cover 180 fits over U-shaped base 176.

Aperture 182 is located at the midpoint of cover 180, while centrally located aperture 184 extends vertically through bed 186 in base 176. Bolt 187 passes through aligned apertures 182, 184, and the enlarged head of bolt 187 rests upon washer 188. The lower end of the shank of bolt 186 is threaded, and nut 190 engages the threaded shank, and is moved therealong. Cover 180 is pressed tightly over base 176 as nut 190 is tightened upon bolt 186. The opposing free ends of the length of timing belt stock 170 are visible, on opposite sides of bolt 186, in FIG. 14A, resting upon bed 186 of base 176.

Numerous modifications and revisions to applicant's belt clamp will occur to the skilled artisan, after reviewing the present application. For example, the threaded bolt and nut might be replaced by a screw that engages threads formed in the walls defining the apertures in the cover and base of the clamp. The size and shape of the protrusions, such as ribs or frusto-conical buttons, on the timing belt stock, may be varied; the same holds true for the complementary recesses formed on the upper surface of the base. Consequently, the appended claims should be broadly construed, commensurate with the spirit and scope of the invention, and should not be limited to their literal terms.

I claim:

1. A belt clamp for securing opposite ends of a length of a timing belt stock into a continuous loop, a plurality of protrusions formed along at least one side of the timing belt stock, said belt clamp comprising:
   a) a U-shaped base including a bottom and an upper surface;
   b) longitudinally extending side walls located at opposite sides of said base;
   c) a plurality of recesses extending along a longitudinal dimension of the upper surface of said base, said recesses adapted to receive the protrusions on the timing belt stock;

d) a bed located in the middle of the upper surface of said base, said bed adapted to receive the opposite ends of a length of timing belt stock;
e) said side walls extending upwardly above said bed and said recesses in said base to prevent lateral slippage of a length of the timing belt stock;
f) a first centrally located aperture extending vertically from said bed through the bottom surface of said base;
g) a cover;
h) said cover possessing an inverted U-shape including a central planar section with depending legs spaced apart at opposite sides of said planar section to fit over said base;
i) a second centrally located aperture extending vertically through said planar section of said cover; and
j) fastening means extending through said first and second apertures in said cover and said base to draw said cover snugly over said base while pressing the opposite ends of the length of the timing belt stock onto said bed on said base.

2. A belt clamp as defined in claim 1, wherein said first aperture in said base and said second aperture in said cover are located in alignment with each other.

3. A belt clamp as defined in claim 1, wherein a plurality of depressions extend across the base, to receive the protrusions on the length of timing belt stock, said depressions being slightly larger in size than the protrusions to snugly receive same in said base.

4. A belt clamp as defined in claim 1, wherein said base is slightly smaller in size than the inverted U-shaped cover that fits thereover.

5. A belt clamp as defined in claim 1, wherein a plurality of ribs are interspersed with said plurality of recesses, in an alternating manner.

6. A belt clamp as defined in claim 1, wherein said fastening means consists of a bolt with a threaded shank, and a nut that is advanced along said shank.

7. A belt clamp as defined in claim 1, wherein said bed interrupts the plurality of recesses in said base.

8. A belt clamp as defined in claim 1, wherein a plurality of protrusions are formed along both sides of the timing belt stock, and said central planar section of said cover has an upper surface and a lower surface, and a plurality of recesses extend along the longitudinal dimension of said lower surface, said recesses adapted to receive the protrusions on one side of the timing belt stock.

9. A belt clamp as defined in claim 2, wherein said bolt has an enlarged head that is tightened to press downwardly upon said central section of said cover.

10. A belt clamp as defined in claim 5, wherein said recesses and said ribs extend laterally across the width of said base.

11. A belt clamp as defined in claim 5, wherein the protrusions on the length of timing belt stock are shaped as frusto-conical buttons, and said recesses on said base are shaped as dimples, said dimples being slightly larger than said frusto-conical projections formed on said length of timing belt stock, to snugly receive same.

* * * * *